US005834715A

United States Patent [19]

Sato et al.

[11] Patent Number: 5,834,715

[45] Date of Patent: Nov. 10, 1998

[54] KEYBOARD

[75] Inventors: Junichi Sato, Fujiyoshida; Hiroshi Fuchigami, Oshino-mura, both of Japan

[73] Assignee: Fanuc Ltd., Yamanashi, Japan

[21] Appl. No.: 762,806

[22] Filed: Dec. 9, 1996

[30] Foreign Application Priority Data

Dec. 11, 1995 [JP] Japan .................................... 7-321464

[51] Int. Cl.$^{6}$ ........................................................ H02B 1/28

[52] U.S. Cl. ........................ 200/5 A; 200/514; 200/302.1

[58] Field of Search .............................. 200/302.1, 302.2, 200/514, 512, 5 A

[56] References Cited

U.S. PATENT DOCUMENTS 4,352,968 10/1982 Pounds ................................ 200/302.2

4,980,522 12/1990 Murakami et al. .............. 200/302.2 X 5,089,671 2/1992 Ranetkins ............................ 200/512 X

*Primary Examiner*—Reneé S. Luebke

*Attorney, Agent, or Firm*—Staas & Halsey

[57] ABSTRACT

A key base plate mounting a membrane sheet with a contact thereon is fixed to a keyboard substrate through a screw. A peripheral edge portion of the key base plate fixed to the keyboard substrate is opposed to a packing fixed to the keyboard substrate. An upper surface of the membrane sheet and the key base plate are covered with an oilproof sheet. A peripheral edge of this sheet is supported between the peripheral edge portion of the key base plate and the packing fixed to the keyboard substrate. When the screw is fastened, the oilproof sheet is pressed with strong force between the peripheral edge portion of the key base plate and the packing fixed to the keyboard substrate.

3 Claims, 3 Drawing Sheets

KEYBOARD

BACKGROUND OF THE INVENTION

1. Field of the Invention

The present invention relates to a keyboard used in a numerical controller, etc. for controlling the operation of an NC machine tool.

2. Description of the Related Art

A conventional example of a keyboard used in a numerical controller for controlling the operation of an NC machine tool will be explained by using FIG. 3. A key base plate 2 is arranged on a keyboard substrate 1. A peripheral edge of this key base board 2 is bent downward so that a peripheral edge portion 22 is formed. This peripheral edge portion 22 comes in contact with the keyboard base plate 1.

A membrane sheet 3 is arranged on the key base plate 2. The membrane sheet 3 is composed of an upper sheet 31, a lower sheet 32 and a spacer 33 arranged between these sheets 31 and 32. Each of the upper sheet 31, the lower sheet 32 and the spacer 33 is constructed by an elastic sheet formed in the shape of a film. A contact portion is constructed by this key base plate 2 and the membrane sheet 3.

A plurality of contacts 311 are formed on a lower surface of the upper sheet 31. A plurality of opposite contacts 321 are also formed on an upper surface of the lower sheet 32. These contacts 311 and these opposite contacts 321 are respectively opposed to each other when the upper sheet 31 and the lower sheet 32 are opposed to each other such that the spacer 33 is interposed between these sheets. The spacer 33 insulates a circuit pattern formed in the upper sheet 31 from a circuit pattern formed in the lower sheet 32. Further, a hole is formed in this spacer 33 in each of positions corresponding to the contacts 311 of the upper sheet 31 and the opposite contacts 321 of the lower sheet 32.

As a result, when a key top 7 is pushed and one contact 311 corresponding to this pushed key top 7 among the contacts 311 of the elastic upper sheet 31 is pressed, this contact 311 comes in contact with one of the opposite contacts 321 of the lower sheet 32 corresponding to this contact 311 through this hole. When the pushing of the key top 7 is released, each of the contact 311 and the opposite contact 321 attaining a contact state so far is returned to a noncontact state.

Circuit patterns respectively drawn from the contact 311 of the upper sheet 31 and the opposite contact 321 of the lower sheet 32 are collected to a connection terminal 34 of the membrane sheet 3. The connection terminal 34 of the membrane sheet 3 is drawn to an internal device of the numerical controller through a lead drawing hole 21 formed in the key base plate 2 and an opening hole 11 formed in the keyboard substrate 1 to connect the contact 311 and the opposite contact 321 to the internal device.

Further, an escutcheon 6 is attached to the keyboard substrate 1 through a screw 8. An insertion fitting 61 is buried in the escutcheon 6. An end tip of the screw 8 is screwed into this insertion fitting 61. A plurality of key tops 7 are attached to this escutcheon 6.

A packing 52 is arranged between the keyboard substrate 1 and the key base plate 2. This packing 52 has a cylindrical shape and is arranged such that the packing 52 surrounds a peripheral portion of the opening hole 11 of the keyboard substrate 1. A packing 51 is also arranged between the key base plate 2 and the escutcheon 6. This packing 51 is arranged such that the packing 51 covers a peripheral portion of the membrane sheet 3 and presses against this peripheral portion and simultaneously blocks the lead drawing hole 21 of the key base plate 2.

When the numerical controller mounting the keyboard as shown in FIG. 3 is arranged in a manufacturing spot, an oil such as a cutting oil, etc. is splashed on an operation face of the key board and enters into the numerical controller from paths a, b and c shown by arrows of FIG. 3. However, it is possible to prevent the oil from entering into internal devices (not shown) of the numerical controller which mounts the keyboard substrate 1 thereon through the opening hole 11 of the keyboard substrate 1 by the packing 51 supported between the key base plate 2 and the escutcheon 6 and the packing 52 supported between the key base plate 2 and the keyboard substrate 1.

These packings 51 and 52 are respectively fastened between the key base plate 2 and the escutcheon 6 and between the key base plate 2 and the keyboard substrate 1 by fastening the screw 8 to move the escutcheon 6 toward the keyboard substrate 1. The sufficiently fastened packings 51 and 52 can prevent entry of the oil. However, fastening force of each of the packings 51 and 52 based on the fastening of the screw 8 is limited by hardness and shape of each of these packings 51 and 52. Further, when making the key base plate 2 to approach the keyboard substrate 1 by fastening the screw 8, a movement of the key base plate 2 is limited since the peripheral edge portion 22 of the key base plate 2 comes in contact with the keyboard substrate 1 at any time. As a result, the fastening force of the packing 52 is limited.

As mentioned above, there is a case in which no conventional packings 51 and 52 shown in FIG. 3 sufficiently prevent passage of the oil even when the screw 8 is strongly fastened. Further, if the oil passes through the packings 51 and 52, these packings themselves are changed in quality and are hardened in a certain case. Accordingly, it is further difficult to strongly fasten the packing 51 between the key base plate 2 and the escutcheon 6 and the packing 52 between the key base plate 2 and the keyboard substrate 1.

When the escutcheon 6 is made of plastic, no fastening force of the screw 8 can be increased so much in consideration of its strength. Further, the fastening force of each of the packings 51 and 52 is limited so that it is more difficult to sufficiently limit the passage of the oil.

When an oil entry preventing function of the packing 51 is deteriorated, the oil entering from the path c reaches an exposed end of the membrane sheet 3 (the upper sheet 31, the lower sheet 32 and the spacer 33) when this oil passes through the packing 51 and the opening portion 21 formed in the key base plate 2. Then, this oil enters into clearances between the upper sheet 31, the lower sheet 32 and the spacer 33. Accordingly, there is a fear that contacts 311 of the upper sheet 31 and contacts 321 of the lower sheet 32 are corroded.

SUMMARY OF THE INVENTION

An object of the present invention is to provide a keyboard capable of effectively preventing an oil such as a cutting oil, etc. from entering into an internal device of a numerical controller which mounts this keyboard thereon through the keyboard even when the oil is directly splashed on the keyboard and a splashed oil is scattered on the keyboard.

In a keyboard according to the present invention, a key base plate is fixed to a keyboard substrate through a screw. A membrane sheet having a contact is arranged on this key base plate. A packing is fixed in a position capable of engaging this packing with a peripheral edge portion of the key base plate. All regions of an upper surface of the above contact portion and the outside of a peripheral edge portion of the contact portion are covered with an oilproof sheet. A peripheral portion of this oilproof sheet is supported between the peripheral edge portion of the contact portion and the packing fixed to the keyboard substrate.

In one form of the keyboard according to the present invention, the key base plate mounting the membrane sheet with a contact thereon is fixed to the keyboard substrate through a screw. The peripheral edge portion of the fixed key base plate is opposed to the packing fixed to the keyboard substrate. An upper surface of the membrane sheet and the key base plate are covered with the oilproof sheet. A peripheral edge of this sheet is supported between the peripheral edge portion of the key base plate and the packing fixed to the keyboard substrate. When the screw is fastened, the oilproof sheet is pressed with strong force between the peripheral edge portion of the key base plate and the packing fixed to the keyboard substrate. As a result, when an oil is directly splashed on the keyboard, it is possible to effectively prevent this oil from entering into an internal device of a numerical controller which mounts the keyboard thereon through a lead drawing hole formed in the key base plate and a portion between the key base plate and the keyboard substrate.

In another form of the keyboard according to the present invention, a cover sheet metal attaching a circuit substrate with a switch thereto is fixed to a keyboard substrate through a screw. A peripheral edge portion of the fixed cover sheet metal is opposed to a packing fixed to the keyboard substrate. All regions of the cover sheet metal are covered with an oilproof sheet. A peripheral edge of this oilproof sheet is supported between the peripheral edge portion of the cover sheet metal and the packing fixed to the keyboard substrate. When the screw is fastened, the oilproof sheet is pressed with strong force between the peripheral edge portion of the cover sheet metal and the packing fixed to the keyboard substrate. As a result, when an oil is directly splashed on the keyboard, it is possible to effectively prevent this oil from entering into an internal device of a numerical controller, etc. mounting the keyboard thereon through the keyboard.

BRIEF DESCRIPTION OF THE DRAWINGS

The foregoing and other objects and feature of the invention will become apparent from the following description of preferred embodiments of the invention with respect,to the accompanying drawings, in which.

DETAILED DESCRIPTION OF THE PREFERRED EMBODIMENTS

Figure 1:
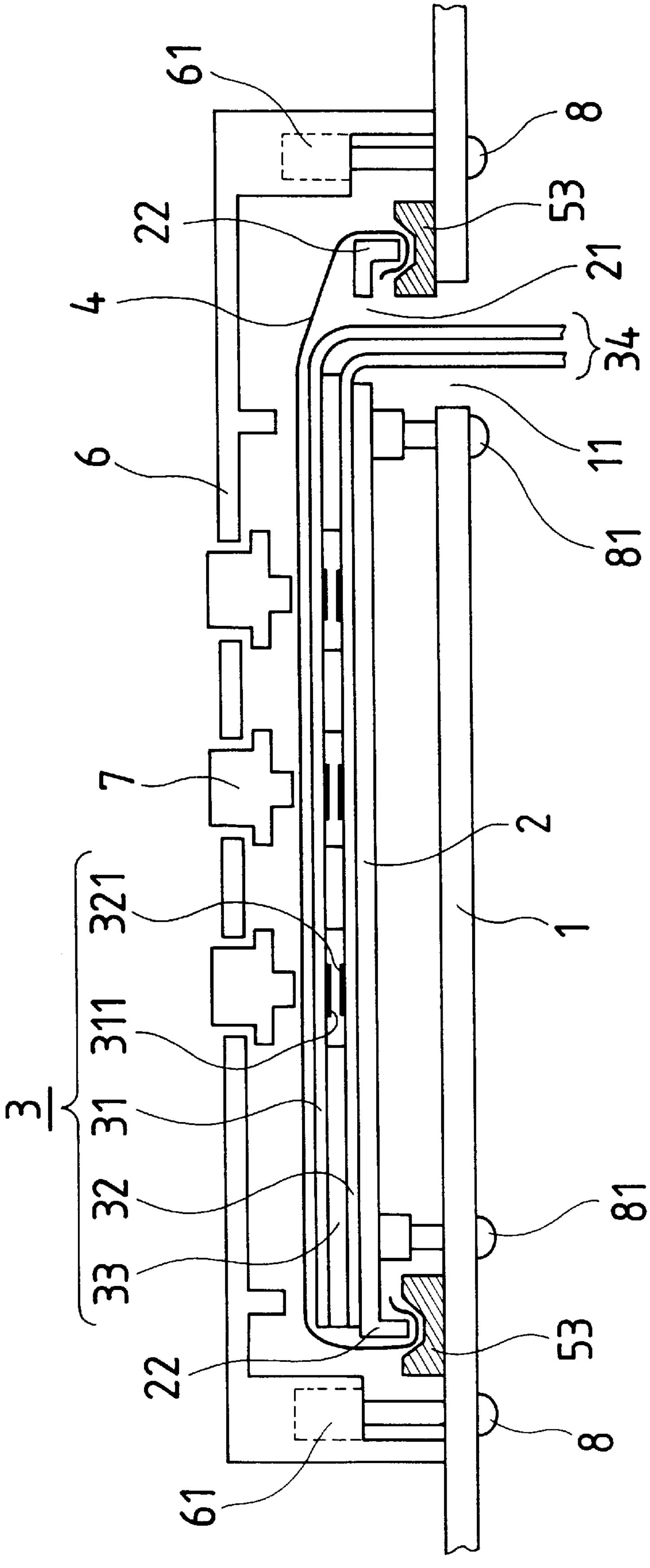
FIG. 1 is a side sectional view of a first embodiment form of a keyboard in accordance with the present invention.

The first embodiment form of the keyboard in accordance with the present invention will first be described by using the side sectional view of FIG. 1.

Figure 3:
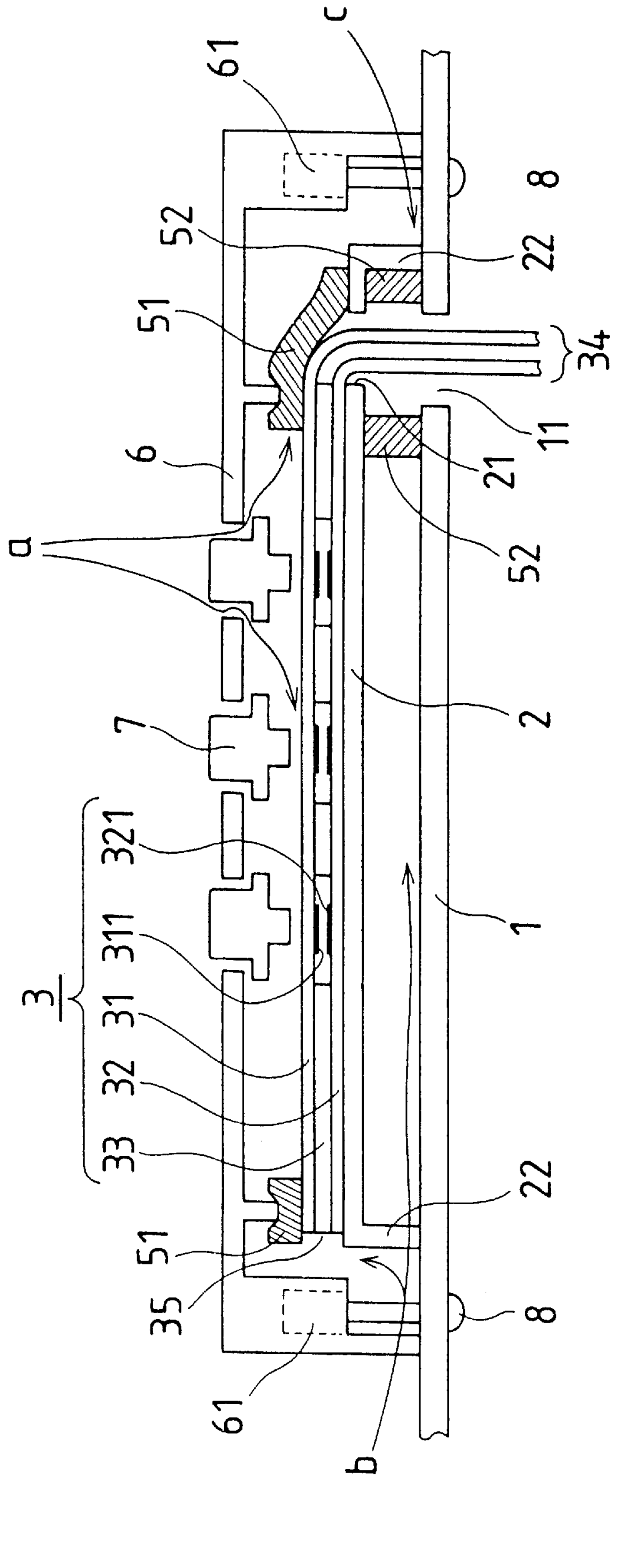
Fig. 3 PRIOR ART
FIG. 3 is a side sectional view of a keyboard belonging to a conventional technique.

This keyboard includes a constructional portion considerably common to the construction of the conventional keyboard shown in FIG. 3. That is, a contact portion is composed of a key base plate 2 and a membrane sheet 3 arranged on the key base plate 2. This membrane sheet 3 is composed of an upper sheet 31 having contacts 311, a lower sheet 32 having contacts 321 and a spacer 33. An insertion fitting 61 is buried into the escutcheon 6 and this escutcheon 6 is attached to the keyboard substrate 1 through the screw 8. The patterns of circuits respectively drawn from the contacts 311 of the upper sheet 31 and the opposite contacts 321 of the lower sheet 32 are collected in a connection terminal 34 of the membrane sheet 3 and are drawn to an internal device of a numerical controller through a lead drawing hole 21 formed in the key base plate 2 and an opening hole 11 formed in the keyboard substrate 1.

The above construction is common to the construction of the conventional example explained with reference to FIG. 3. However, this embodiment form further has the following features.

The key base plate 2 is attached to the keyboard substrate 1 through the screw 81. This key base plate differs from the key base plate 2 shown in FIG. 3 in that no peripheral edge portion 22 comes in contact with the keyboard substrate 1. That is, a packing 53 fixed to the keyboard substrate 1 is interposed between the keyboard substrate 1 and the peripheral edge portion 22 of the key base plate 2.

A portion from an upper surface of the membrane sheet 3 fixed to the key base plate 2 to the peripheral edge portion of the key base plate 2 is covered with one oilproof sheet 4. Accordingly, the lead drawing hole 21 formed in the key base plate 2 is also covered with this oilproof sheet 4. This oilproof sheet 4 is formed by a polyester film of tens of $\mu$m in thickness and has oilproof properties and flexibility. A peripheral edge portion of this oilproof sheet 4 is supported between the peripheral portion 22 of the key base plate 2 and the packing 53 fixed to the keyboard substrate 1.

Accordingly, when the screw 81 is fastened so that the key base plate 2 approaches the keyboard substrate 1, the oilproof sheet 4 is pressed with strong force between the peripheral edge portion 22 of the key base plate 2 and the packing 53 fixed to the keyboard substrate 1. As a result, when an oil such as a cutting oil, etc. is directly splashed on the keyboard and a splashed oil is scattered on the keyboard, it is possible to effectively prevent this oil from entering into the internal device of the numerical controller which mounts the keyboard thereon through the lead drawing hole 21 formed in the key base plate 2 and a portion between the key base plate 2 and the keyboard substrate 1.

Figure 2:
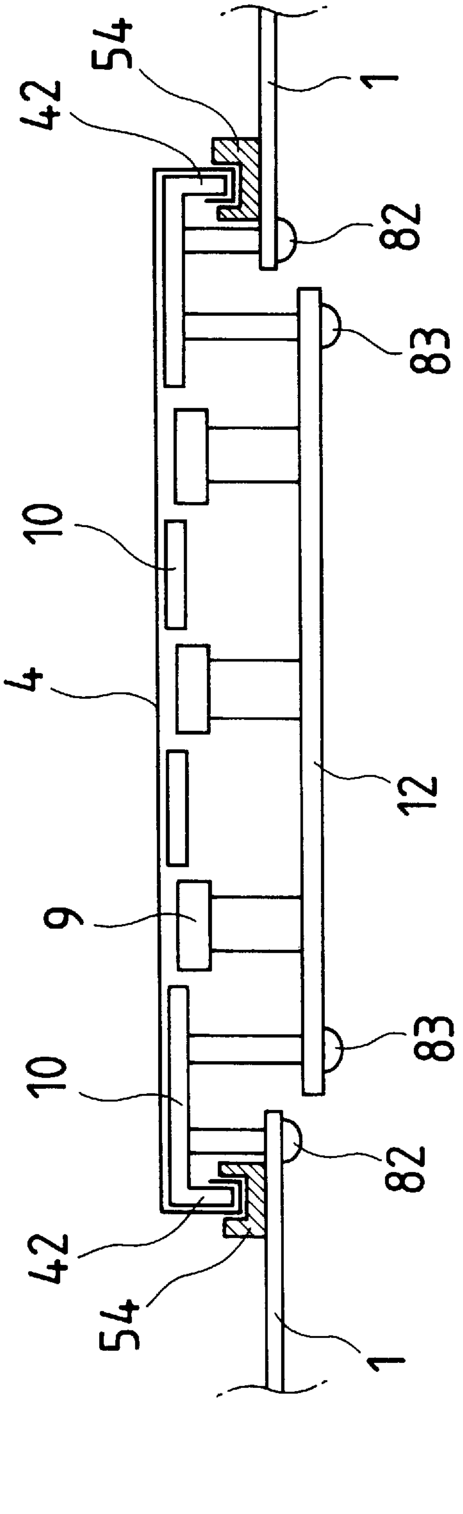
FIG. 2 is a side sectional view of a second embodiment form of the keyboard in accordance with the present invention.

A second embodiment form of the keyboard in accordance with the present invention will next be explained by using the side sectional view of FIG. 2.

A cover sheet metal 10 is attached to a keyboard substrate 1 through a screw 82. Further, a circuit substrate 12 is attached to this cover sheet metal 10 through a screw 83. A plurality of switches 9 of a normal system are attached to this circuit substrate 12. A contact portion is constructed by this cover sheet metal 10 and the circuit substrate 12 attaching the switches 9 thereto.

A peripheral edge portion 42 is formed by bending a peripheral edge of the cover sheet metal 10 downward. A packing 54 fixed to the keyboard substrate 1 is interposed between this peripheral edge portion 42 and the keyboard substrate 1. Further, all regions of an upper surface of the cover sheet metal 10 and an outside face of the peripheral edge portion 42 of the cover sheet metal 10 are covered with an oilproof sheet 4. This oilproof sheet 4 is formed by a polyester film of tens of $\mu$m in thickness and has oilproof properties and flexibility. A peripheral edge portion of this oilproof sheet 4 is supported between the peripheral edge portion 42 of the cover sheet metal 10 and the packing 54 fixed to the keyboard substrate 1.

Accordingly, when the screw 82 is fastened and the cover sheet metal 10 approaches the keyboard substrate 1, the oilproof sheet 4 is pressed with strong force between the peripheral edge portion 42 of the cover sheet metal 10 and the packing 53 fixed to the keyboard substrate 1. As a result, when an oil such as a cutting oil is directly splashed on the keyboard and a splashed oil is scattered on the keyboard, it is possible to effectively prevent this oil from entering into an internal device of a numerical controller which mounts the keyboard thereon through the keyboard.

What is claimed is:

1. A keyboard comprising:

a keyboard substrate;

an escutcheon supported by said keyboard substrate, said escutcheon having a plurality of holes;

a plurality of key tops projecting through said plurality of holes of said escutcheon;

a contact portion supported by said keyboard substrate and comprising a surface and a peripheral edge;

a packing fixed onto said keyboard substrate in a position capable of engaging the packing with a peripheral edge portion of said contact portion; and a sheet covering all regions of the surface of said contact portion and the outside of the peripheral edge portion of the contact portion, wherein said sheet is provided between said plurality of key tops and said contact portion and comprises an oil proof material and a peripheral portion of this sheet is supported between the peripheral edge portion of said contact portion and the packing fixed to said keyboard substrate.

2. The keyboard as recited in claim 1, wherein said contact portion comprises a key base plate and a membrane sheet fixedly arranged on the key base plate and having a contact; and said key base plate comprises a peripheral edge portion and is fixed to the keyboard substrate through a fastening screw.

3. A keyboard comprising:

a keyboard substrate;

a contact portion supported by said keyboard substrate;

a packing fixed onto said keyboard substrate in a position capable of engaging the packing with a peripheral edge portion of said contact portion; and a sheet covering all regions of a surface of said contact portion and the outside of a peripheral edge portion of the contact portion, wherein said sheet comprises an oil proof material and a peripheral portion of the sheet is supported between the peripheral edge portion of said contact portion and the packing fixed to said keyboard substrate, and wherein said contact portion comprises:

a cover sheet metal fixed to the keyboard substrate through a fastening screw, a circuit substrate fixed to the cover sheet metal through a screw, and a switch group attached to the circuit substrate; and said cover sheet metal comprises the peripheral edge portion.

* * * * *